United States Patent
Corona Galván et al.

(10) Patent No.: US 12,234,346 B2
(45) Date of Patent: Feb. 25, 2025

(54) FUNCTIONALIZED RUBBERS

(71) Applicant: DYNASOL ELASTÓMEROS, S.A.U., Madrid (ES)

(72) Inventors: Sergio Corona Galván, Madrid (ES); Pedro José Pérez Romero, Huelva (ES); María del Mar Díaz Requejo, Huelva (ES); Álvaro Beltrán Martín, Huelva (ES)

(73) Assignee: DYNASOL ELASTÓMEROS, S.A.U., Madrid (ES)

( * ) Notice: Subject to any disclaimer, the term of this patent is extended or adjusted under 35 U.S.C. 154(b) by 807 days.

(21) Appl. No.: 17/311,923

(22) PCT Filed: Dec. 26, 2019

(86) PCT No.: PCT/EP2019/087046
§ 371 (c)(1),
(2) Date: Jun. 8, 2021

(87) PCT Pub. No.: WO2020/136223
PCT Pub. Date: Jul. 2, 2020

(65) Prior Publication Data
US 2022/0025162 A1   Jan. 27, 2022

(30) Foreign Application Priority Data
Dec. 28, 2018 (EP) .................................... 18383003

(51) Int. Cl.
*C08L 15/00* (2006.01)
*B01J 31/14* (2006.01)
*C08C 19/22* (2006.01)

(52) U.S. Cl.
CPC ............. *C08L 15/00* (2013.01); *B01J 31/146* (2013.01); *C08C 19/22* (2013.01)

(58) Field of Classification Search
CPC ......... C08C 19/00; C08C 19/20; C08C 19/22; C09D 109/06; C09J 109/06
See application file for complete search history.

(56) References Cited

U.S. PATENT DOCUMENTS

| | | | |
|---|---|---|---|
| 2010/0249313 A1* | 9/2010 | Okazaki | C09J 153/02 524/505 |
| 2012/0021223 A1 | 1/2012 | Griffiths et al. | |
| 2018/0002456 A1 | 1/2018 | Nandy et al. | |
| 2018/0118857 A1 | 5/2018 | Olde Boerrigter et al. | |

FOREIGN PATENT DOCUMENTS

| | | | | |
|---|---|---|---|---|
| GB | 1426791 A | * | 3/1976 | ............. C08C 19/22 |
| WO | WO2015/181415 A1 | | 12/2015 | |
| WO | 2016/170019 A1 | | 10/2016 | |

OTHER PUBLICATIONS

Lo Verso, F., Likos, C.N., End-functionalized polymers: Versatile building blocks for soft materials, Polymer 49 (2008) 1425-1434.
Nakahama, S., Hirao, A., Protection and polymerization of functional monomers: Anionic living polymerization of protected monomers, Prog. Polym. Sci., 15, 299-335, 1990.
González, L., et al., A new carbon black-rubber coupling agent to improve wet grip and rolling resistance of tires, Rubber Chemistry and Technology, 69, 266-272, 1996.
Beltrán, Á, et al., Mild catalytic functionalization of styrene-butadiene rubbers, Macromolecules, 2012, 45, 9267-9274.
Urbano, J., et al., Catalytic Cyclopropanation of Polybutadienes, J. Polymer Sci .: Part A: Polymer Chemistry, DOI: 10.1002/POLA, 2010, 48, 4439-4444.
Peng, C.-C., Abetz, V., A simple pathway toward quantitative modification of polybutadiene: A new approach to thermoreversible cross-linking rubber comprising supramolecular hydrogen-bonding networks, Macromolecules, 2005, 38, 5575-5580.

* cited by examiner

*Primary Examiner* — Marc S Zimmer
*Assistant Examiner* — Jeffrey S Lenihan
(74) *Attorney, Agent, or Firm* — Casimir Jones, SC; Tristan A. Fuierer (57) ABSTRACT

The present invention relates to a process for the functionalization of a rubber polymer comprising reacting the rubber polymer with at least one source of nitrene or carbene, in the presence of a catalyst of formula $Tp^xAg$, wherein $Tp^x$ represents a hydrotris(pyrazolyl)borate ligand. This process leads to selective rubber functionalization without secondary reactions such as chain scission or cross linking and produces functionalized rubbers with improved compatibilization properties. The invention also refers to the polymer produced therefrom and to uses of said polymer.

10 Claims, 7 Drawing Sheets

FIG. 1

SBS catalyst | X = CHCO$_2$Et or NSO$_2$Ar

SEBR catalyst | X = CHCO$_2$Et or NSO$_2$Ar

FUNCTIONALIZED RUBBERS

CROSS-REFERENCE TO RELATED APPLICATIONS

This application is filed under the provisions of 35 U.S.C. § 371 and claims the priority of International Patent Application No. PCT/EP2019/087046 filed on 26 Dec. 2019 entitled "FUNCTIONALIZED RUBBERS" in the name of Sergio CORONA GALVÁN, et al., which claims priority to European Patent Application No. 18383003.3, filed on 28 Dec. 2018, both of which are hereby incorporated by reference herein in their entirety.

FIELD OF THE INVENTION

The present invention relates to the field of functionalized rubbers and preparation method. More particularly, the present invention relates to the field of chemical modification of rubbers, hydrogenated and non-hydrogenated, by metal catalyzed addition of nitrene and/or carbene groups and their uses, especially in adhesives, in plastics impact modification, plastics blends compatibilization, asphalt modification, nanomaterials, and in compounds for tires, among others.

BACKGROUND

Styrene-butadiene synthetic rubbers comprise polymer materials derived from styrene and butadiene. These rubbers may comprise polymer chains of randomly distributed styrene and butadiene monomers (SBR) but may also be materials comprising homopolymers and block copolymers. SBS triblock copolymers consist of a polymer chain of styrene monomers, followed by a polymer chain of butadiene monomers in turn followed by another polymer chain of styrene monomers. The hydrogenation of the butadiene monomers, i.e., the conversion of the diene double bonds to single bonds leads to what are known as SEBS, block copolymers of styrene-ethylene-butylene-styrene.

Polymers containing conjugated diene and alkenyl aromatic groups, such as triblock or penta-block copolymers of styrene-butadiene or styrene-isoprene, have already been commercialized and used in many applications, for example, adhesives, shoe soles, and polymer modification.

The mechanical behavior of a rubber material dictates its industrial application. For example, the degree of deformation under stress can be crucial to decide a possible application of a given polymeric material. This behavior depends on the physico-chemical properties of the polymer such as composition, molecular weight, molecular weight distribution and so on. In this sense, the presence of polar groups in the polymer chains is a feature that also affects other polymer properties such as adhesion or solvent resistance, and can be of particular importance in polymer blending as a strategy to improve material performance through interfacial and morphological modifications.

SBS and SEBS materials are non-polar materials. For this reason, it is often difficult to obtain compatible compositions comprising rubber materials with engineering plastics which are usually more polar. The functionalization of polymer substrates with polar groups is a known strategy that allows the modification of their surface energy, mechanical properties, polarity, hydrophilicity or hydrophobicity, oleophilicity or oleophobicity, and/or the like. This strategy may be exploited in applications such as impact modification of engineering plastics, compatibilization of polymer substrates with immiscible materials such as technical plastics or silica, adhesives, coatings, compositions suitable for car tires, and the like.

However, the functionalization of polymer substrates with polar groups is still a difficult task since the process normally generates undesirable secondary reactions such as chain cross-linking or chain scission reactions.

Several methods to obtain functionalized polymers by anionic polymerization exist. Among them, the methodology of terminating living polymers with electrophilic reagents, especially living alkyllithium-initiated polymers, is perhaps the most useful. However, this methodology often gives incomplete functionalization reactions and side products. (Anionic Polymerization: Principles and Practical Applications", Hsieh, H. L., Quirk, Roderic P., Marcel Dekker Inc, New York, 1996, page 262). Development of better ways to functionalize polymers is therefore essential.

The use of functionalized initiators in living anionic polymerizations is another method to obtain chain-end functionalized polymers. Lithium containing initiators such as dimethylaminopropyllithium or (3-(t-butyldimethylsiloxy)propyl) lithium have been described (U.S. Pat. Nos. 5,552,753; 6,197,891). The functional groups provided by these kind of initiators are not stable under anionic polymerization conditions; therefore, they are protected with other, for example alkyl, groups that are stable during polymerization. In order to obtain the functionalized polymer, a final deprotection step is necessary. The obvious disadvantage of this methodology is the necessity of effecting additional protection and deprotection reactions.

Both the use of functionalized initiators, and the termination of living polymers with functional groups, allow the incorporation of a limited number of functional groups in each polymer molecule, namely at the initial and/or the final ends.

In this context, the presence of chain-end functional groups can affect the surface and interfacial properties of polymers (Lo Verso, F., Likos, C. N., *Polymer,* 2008, 49, 1425-1434). However, in order to change bulk physical properties of polymers, or to incorporate a higher density of functional groups, they have to be incorporated into the repeating units along the polymer chain (in-chain functionalization).

Few efficient methods are known to date to obtain in-chain functionalized polymers. In-chain functionalized commercial polymers have been typically made by reactive melt extrusion in the presence of a free radical initiator. This method is not efficient, since chain-crosslinking and chain-scission side reactions are frequent during the process. Problems arising from the use of radical initiators in functionalization of polymers include the difficulty to control the amount and location of the functional groups in the polymer chain, as well as the secondary crosslinking and scission reactions that often adversely modify or degrade the polymer backbone.

An alternative way to synthesize in-chain functionalized polymers is the use of functionalized monomers in anionic polymerizations. A major problem with respect to this approach is that one must first prepare a new monomer for each new functional group. Further, many important functional groups are not stable to organolithium compounds. Therefore, it is often necessary to protect the functional groups with suitable protecting groups that are stable during the polymerization reaction. This methodology has the drawback that the protecting groups must then be removed in subsequent deprotection reactions. In addition to the former, even when these monomers are functionalized with protected functional groups, they can only be polymerized in a controlled manner to form well-defined polymers, generally at −78° C. and in THF (Nakahama, S.; Hirao, A. *Prog. Polym. Sci.* 1990, 15, 299). In summary, these procedures involving new monomers for each functional group have the obvious disadvantages of having two additional steps in comparison to common polymerization processes: the introduction of a protecting group in the monomer and the necessity of effecting a deprotection step, as well as the low reaction temperature/polar solvent requirements. These conditions are not economically feasible for commercial processes, since anionic polymerizations in industrial processes are generally performed at room temperature or above, in hydrocarbon solvents, and the introduction of costly, time-consuming and inefficient post-polymerization steps is preferably avoided.

Gonzalez, L. et al. (Rubber Chem Technol, 1996, 69, 266-272) describes an alternative method of functionalizing SBR for compatibilization with carbon black. The method consists in the functionalization of the butadiene chains of SBR via thermal nitrene addition of 4-aminobenzenesulfonyl azide. However, this method requires temperatures over 150° C. for the in-situ generation of the nitrene group upon azide decomposition. The high temperatures lead to SBR vulcanization processes, which increase the cross-link density of the polymer chains. Therefore, such thermal functionalization processes come with the undesirable collateral effect of increasing the rigidity of the SBR material due to cross linking side-reactions. Moreover, there is a lack of control over the functionalization level and selectivity on the SBR polymer chains.

WO 2016/170019 discloses a process for functionalizing SBR and polyolefin polymers with monoazides at temperatures of 80-250° C. However, the process does not allow selective functionalization of rubber polymers, requires high temperatures of reaction and leads to crosslinking side reactions.

Therefore, a need exists for rubber functionalization processes that improve their compatibility with other materials without the downside of collateral undesired reactions affecting the rubber chains such as cross linking.

In the work of Beltrán A. et al. (Macromolecules, 2012, 45 (23), 9267-9274), it is disclosed the functionalization of SBR rubbers with carboxylate polar groups at room temperature. The reaction consists in the catalytic in-situ formation of carbene groups from ethyl diazoacetate in presence of the copper catalyst hydrotris(3,4,5-tribromopyrazolyl)borate ($Tp^{Br3}Cu$). The ethyl diazoacetate reacts with the catalyst to produce metal-carbene species that undergo carbene addition to the double bonds of the butadiene monomers. However, the copper catalyst is very difficult to remove and the obtained rubber is not stable with time, as oxidation and side reactions occur upon storage.

Therefore, a need in the art exists for economical and versatile rubber functionalization processes that improve their compatibility with other materials without the downside of collateral undesired reactions affecting the rubber chains such as cross linking or chain scission reactions. The increase in the compatibility of rubbers opens the way for blending with polar materials and for their industrial application in several compositions.

SUMMARY OF THE INVENTION

The authors of the present invention have surprisingly found that nitrene and/or carbene addition to rubber polymer chains is possible and leads to selective rubber functionalization without secondary reactions such as chain scission or cross linking. The inventors have further found that the method of the invention produces rubbers with improved compatibilization properties. These and further advantages will be described in detail below and defined by the claims.

Thus, the present invention provides a general method to introduce in a controlled way a number of functionalities along the polymer chain (in-chain functionalization), in the desired amount, in the desired site or position, and of the desired type, in diene homopolymers and copolymers, and in alkenyl aromatic-diene copolymers, said homopolymers or copolymers being hydrogenated or non-hydrogenated. Moreover, according to some variants of the invention, the polymer may be also provided with chain-end functionalization.

Accordingly, in a first aspect, the present invention is directed to a process for the functionalization of a rubber polymer, comprising the step of reacting the rubber polymer with at least one source of nitrene or carbene, in the presence of a catalyst of formula $Tp^xAg$, wherein $Tp^x$ represents a hydrotris(pyrazolyl)borate ligand.

A second aspect of the present invention relates to a rubber polymer, functionalized with at least one group-$NH_nSO_2(C_6H_4)R^1$, wherein each occurrence of $R^1$ is independently selected from H, $C_{1-6}$ alkyl, $C_{3-7}$ cycloalkyl, $C_{6-10}$ aryl, I, Br, Cl, F, $NO_2$, $CF_3$, $OR^3$, $COOR^3$, $OCOR^3$, wherein $R^3$ is independently selected from H, $C_{1-6}$ alkyl, $C_{3-7}$ cycloalkyl, $C_{6-10}$ aryl and wherein n is 0 or 1.

A third aspect of the present invention relates to a rubber polymer obtainable by the process of the invention.

A fourth aspect of the present invention relates to the use of a catalyst of formula $Tp^xAg$ in the functionalization of rubber polymers, wherein $Tp^x$ represents a hydrotris(pyrazolyl)borate ligand.

Finally, a fifth aspect of the present invention relates to the use of the functionalized rubber polymer of the invention in asphalt compositions, tire compositions, adhesive compositions, tie layer compositions, sealant compositions, coating compositions, reinforcing compositions, overmolding compositions, plastics impact modification, engineering plastics blends compatibilization, fiber and nonwoven compositions, nanomaterials, medical devices, cable compositions and as binders for electrodes in lithium-ion secondary batteries.

DESCRIPTION OF THE DRAWINGS

These and other characteristics and advantages of the invention will become clearly understood in view of the detailed description of the invention which becomes apparent from preferred embodiments, given just as an example and not being limited thereto, with reference to the drawings.

FIG. 1: Representative reaction scheme for the functionalization of saturated rubbers such as SEBS.

FIG. 2: Representative reaction scheme for the functionalization of unsaturated rubbers such as SBS, SBR.

FIG. 3: $^1H$ NMR spectrum of a functionalized sample of SEBS with added NTs groups, using naphthalene as internal standard.

FIG. 4: Top: GPC of the starting material SEBS. Bottom: GPC of the functionalized SEBS with NTs functionalization.

FIG. 5: Notched Charpy Impact at 25° C. (top) and at −30° C. (bottom) of three comparative samples and of a sample of the invention.

FIG. 6: SEM image of comparative sample 2.

FIG. 7: SEM image of comparative sample 3.

FIG. 8: SEM image of sample 4 of the invention.

DETAILED DESCRIPTION OF THE INVENTION

Unless defined otherwise, all technical and scientific terms and expressions used herein have the same meaning as commonly understood to one of ordinary skill in the art to which this disclosure belongs.

Process of the Invention

A first aspect of the invention is directed to a process for the functionalization of a rubber polymer, comprising the step of reacting the rubber polymer with at least one source of nitrene or carbene, in the presence of a catalyst of formula $Tp^xAg$, wherein $Tp^x$ represents a hydrotris(pyrazolyl)borate ligand.

The reaction of the present invention is a catalytic reaction, where the catalyst $Tp^xAg$ allows generation of very short lived, intermediate metal-nitrene $Tp^xAg=NR$ or metal-carbene $Tp^xAg=CR_2$ species from sources of nitrene or carbene, respectively.

Without wishing to be bound by any particular theory, it is believed that in the process of the present invention, the reaction occurs via nitrene or carbene C—H insertion, wherein a nitrene or carbene can insert into a carbon to hydrogen covalent bond of the rubber polymer chain or via nitrene or carbene addition to a double bond to form a three-membered ring.

The "source of nitrene or carbene" is to be understood as a reactant that leads to the formation of metal-nitrene or metal-carbene species in the presence of the metal catalyst. Non-limiting examples of nitrene sources are $PhINSO_2(C_6H_4)R^1$, $NaClNSO_2(C_6H_4)R^1$ and $N_3SO_2(C_6H_4)R^1$, wherein $R^1$ is independently selected from H, $C_{1-6}$ alkyl, $C_{3-7}$ cycloalkyl, $C_{6-10}$ aryl, I, Br, Cl, F, $NO_2$, $CF_3$, $OR^3$, $COOR^3$, $OCOR^3$ and $NR^3{}_2$, wherein each $R^3$ is independently selected from H, $C_{1-6}$ alkyl, $C_{3-7}$ cycloalkyl and $C_{6-10}$ aryl.

In a preferred embodiment, the nitrene source is an iminophenyliodonane; preferably a compound of formula $PhINSO_2(C_6H_4)R^1$ as defined above.

In an embodiment, $R^1$ in the nitrene sources defined above is a $C_{1-6}$ alkyl; preferably a $C_{1-3}$ alkyl. More preferably, $R^1$ is a methyl group.

In a particular case, a nitrene source is PhINTs, wherein Ts represents a —$SO_2$-tolyl group, known as tosyl group.

Non-limiting examples of carbene sources are $N_2CHCO_2R$ and $N_2C(R')CO_2R$, wherein R is selected from $C_{1-6}$ alkyl, $C_{3-7}$ cycloalkyl and $C_{6-10}$ aryl group. Preferably, R is a $C_{1-6}$ alkyl; more preferably a $C_{1-3}$ alkyl group; even more preferably R is ethyl. R' is a $C_{1-6}$ alkyl or a $C_6$-$C_{12}$ aryl group.

In an embodiment, the hydrotris(pyrazolyl)borate ligand, $Tp^x$, has the following formula wherein Ra, Rb and Rc are independently selected from H, halogen, $C_{1-6}$ alkyl, $C_{1-6}$ haloalkyl, $C_{3-7}$ cycloalkyl, $C_{6-10}$ aryl, $C_{6-10}$ aryl substituted with halogen and $C_{6-10}$ aryl substituted with $C_{1-6}$ alkyl.

In a particular embodiment, Ra, Rb and Rc are independently selected from H, Br, Cl, Me, Et, iPr, tBu, $CF_3$, Cy, Ph and p-Cl—$C_6H_4$.

In a particular embodiment, the hydrotris(pyrazolyl)borate ligand, $Tp^x$, is selected from the group consisting of hydrotris(3,4,5-tribromopyrazolyl)borate ($Tp^{Br3}$), hydrotris(3-phenyl-pyrazolyl)borate ($Tp^{Ph}$), hydrotris(3,5-dimethyl-4-bromopyrazolyl)borate ($Tp^{*,Br}$), hydrotris(3,5-bis(trifluoromethy)-4-bromopyrazolyl)borate ($Tp^{(CF3)2,Br}$) and hydrotris(3,5-dimethyl-pyrazolyl)borate ($Tp^*$).

In a particular embodiment, the catalyst is used in the process of the invention in the form of precursor $Tp^xAgL$, wherein L is a ligand selected from an aprotic solvent, such as acetonitrile, THF or acetone. In this case, the L ligand first dissociates leading to the active catalyst $Tp^xAg$.

The rubber polymer used in the process of the invention is to be understood as either a hydrogenated or a non-hydrogenated copolymer comprising conjugated diene and alkenyl aromatic monomers or a diene homopolymer or copolymer comprising conjugated diene monomers, preferably comprising butadienes. The meaning of non-hydrogenated is well known in the art but is further clarified herein as a rubber polymer resulting from the copolymerization or homopolymerization of the above-mentioned monomers and which has not been subjected to hydrogenation of the dienic unsaturations.

In a particular embodiment, the rubber polymer is hydrogenated. In another particular embodiment, the rubber polymer is non-hydrogenated.

According to a particular embodiment, for a hydrogenated copolymer at least 50% of the original dienic unsaturations of the polymer are hydrogenated, preferably more than 85%, more preferably more than 95%. According to another particular embodiment, less than 1% of the aromatic units are hydrogenated. The hydrogenation of the rubber polymers may be monitored by different analytical techniques such as Infrared spectroscopy (IR) or Nuclear Magnetic Resonance (NMR).

Non-limiting examples of alkenyl aromatic monomers that form the rubber polymer used in the process of the invention include styrene, vinylpyridine (such as 2-vinylpyridine, 4-vinylpyridine), vinylnaphthalene (such as 1-vinylnaphthalene, 2-vinylnaphthalene), 1,2-diphenyl-4-methylhexene and mixtures thereof. The alkenyl aromatic monomers may be optionally substituted with one or more substituents preferably selected from the group consisting of $C_{1-6}$ alkyl, $C_{3-7}$ cycloalkyl, $C_{6-15}$ aryl and $C_{1-6}$ alkyl($C_{6-10}$) aryl.

Representative examples of substituted alkenyl aromatic monomers include alpha-methylstyrene, vinyltoluene, 3-methylstyrene, 3,5-diethylstyrene, 2-ethyl-4-benzylstyrene, 4-phenylstyrene, 4-p-tolylstyrene, 4-(tert-butyl)-styrene, 2,4-divinyltoluene, 1-alpha-methylvinylnaphthalene, 2-alpha-methylvinylnaphthalene, 4,5-dimethyl-1-vinylnaphthalene, silylated styrene, and mixtures thereof.

In a preferred embodiment, the alkenyl aromatic monomers are selected from optionally substituted styrene groups, such as styrene, alpha-methylstyrene, 3-methylstyrene, 3,5-diethylstyrene, 2-ethyl-4-benzylstyrene, 4-phenylstyrene, 4-p-tolylstyrene, 4-(tert-butyl)-styrene, silylated styrene, and mixtures thereof. More preferably, the alkenyl aromatic monomer is styrene.

Non-limiting examples of conjugated diene monomers that form the rubber polymer used in the process of the invention include 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, farnesene, myrcene and their mixtures.

In a preferred embodiment, the conjugated diene monomers are selected from 1,3-butadiene or isoprene. More preferably, the conjugated diene monomer is 1,3-butadiene.

The different monomers forming part of the polymer used in the process of the invention may be located in any monomer sequence (block, tapered or random, or a combination thereof).

Also, the polymer used in the process of the invention may be linear or branched. Branched polymers include grafted polymers, star-shaped polymers, brush copolymers and comb copolymers.

Preferably, the rubber polymer used in the process of the invention is a copolymer comprising styrene, butadiene, or isoprene monomeric units or a diene homopolymer or copolymer comprising diene monomeric units. More preferably, the rubber polymer used in the process of the invention is selected from the group consisting of polybutadiene (PBR), polyisoprene, isoprene-butadiene copolymers, styrene-butadiene copolymers (SBR), styrene-isoprene copolymers, triblock styrene-butadiene-styrene copolymers (SBS), styrene-isoprene-butadiene copolymers, and styrene-ethylene-butylene-styrene copolymers (SEBS). In a preferred embodiment, the styrene-butadiene copolymers (SBR) are styrene-butadiene random or tapered block copolymers.

The relative amounts of styrene, butadiene or isoprene monomeric units in the rubber polymer can be, for the purposes of the process of the invention, any suitable amounts according to specific needs of the end-product.

In a particular embodiment, the rubber polymer comprises more than 1, 2, 3, 4, 5, 6, 7, 8, 9 or 10% of styrene monomeric units with regards to the total number of monomers in the polymer. In a preferred embodiment, the rubber polymer comprises at least more than 10, 20, 30, 40, 50, 60, 70, 80, 85 or 90% of styrene monomeric units with regards to the total number of monomers in the polymer.

In a particular embodiment, the rubber polymer comprises more than 1, 2, 3, 4, 5, 6, 7, 8, 9 or 10% of butadiene monomeric units with regards to the total number of monomers in the polymer. In a preferred embodiment, the rubber polymer comprises at least more than 10, 20, 30, 40, 50, 60, 70, 80, 85 or 90% of butadiene monomeric units with regards to the total number of monomers in the polymer.

In a particular embodiment, the rubber polymer comprises more than 1, 2, 3, 4, 5, 6, 7, 8, 9 or 10% of isoprene monomeric units with regards to the total number of monomers in the polymer. In a preferred embodiment, the rubber polymer comprises at least more than 10, 20, 30, 40, 50, 60, 70, 80, 85 or 90% of isoprene monomeric units with regards to the total number of monomers in the polymer.

In another, particular embodiment, the rubber polymer comprises less than 90, 80, 70, 60, 50, 40, 30, 20 or 10% of styrene monomeric units with regards to the total number of monomers in the polymer.

In another, particular embodiment, the rubber polymer comprises less than 90, 80, 70, 60, 50, 40, 30, 20 or 10% of butadiene monomeric units with regards to the total number of monomers in the polymer.

In another, particular embodiment, the rubber polymer comprises less than 90, 80, 70, 60, 50, 40, 30, 20 or 10% of isoprene monomeric units with regards to the total number of monomers in the polymer.

The copolymer rubbers comprising a conjugated diene monomer and an alkenyl aromatic monomer will typically contain from 2 weight percent to 50 weight percent alkenyl aromatic monomer, such as styrene, and from 50 weight percent to 98 weight percent conjugated diene monomer, such as 1,3-butadiene.

The process of the invention has the surprising advantage that it allows producing a functionalized rubber polymer without undesired side-reactions, such as chain scission, chain cross-linking or oxidation. Therefore, the process of the invention does not modify the Polydispersity Index (PDI) of the rubber polymer. In other words, in the process of the invention, the PDI of the rubber polymer used therein is at least 90%, preferably at least 95% the PDI of the resulting, functionalized rubber polymer. In a preferred embodiment, the PDI of the rubber polymer used therein is equal or essentially the same to the PDI of the resulting, functionalized rubber polymer.

The skilled person readily understands the meaning of PDI (polydispersity index), which is further clarified herein as the result of $M_w/M_n$, where $M_w$ is the weight-average molar mass and $M_n$ is the number-average molar mass of the molecular weight distribution of the polymer. A uniform polymer is composed of molecules of the same mass and therefore its PDI value is 1, whereas a non-uniform polymer, or disperse polymer, is characterized by a PDI value greater than 1. The higher the PDI value of a polymer, the more disperse said polymer is.

In the present disclosure, the weight-average molar mass, $M_w$, is obtained by the GPC (Gel Permeation Chromatography) technique. Also, in the present disclosure, the number-average molar mass, $M_n$, is obtained by the same technique.

In a particular embodiment, the process of the present invention is copper-free. This has the further advantage that the resulting functionalized polymer does not undergo oxidation reactions upon storage.

In a particular embodiment, the process of the invention is such that no heating is needed to effect the functionalization reaction, i.e., without heating the reaction, so that the reaction occurs at room temperature. In a preferred embodiment, the process of the invention is carried out at a temperature equal to or below 120° C., preferably below 90° C., preferably below 80° C., preferably between 0 and 50° C., more preferably between 1° and 40° C., even more preferably between 15 and 35° C.

In a particular embodiment, the process of the invention is effected in solution. In an embodiment the reaction is performed in the presence of an organic solvent, for example, hydrocarbon and halogen-substituted hydrocarbon solvents, such as cyclohexane, dichloroethane, dichloromethane, n-hexane, pentane, isooctane, methylcyclohexane, isohexane, n-heptane, n-octane, benzene, toluene, xylene, petroleum ether and mixtures therefrom.

In the process of the invention, the molar ratio between catalyst and nitrene or carbene source molecules is from 1:100 to 1:10, preferably from 1:75 to 1:20, more preferably from 1:75 to 1:30.

The amount of nitrene or carbene source can vary depending on the desired rate of functionalization, In a particular embodiment, the molar ratio between nitrene/carbene source and rubber polymer is between 1:100 to 1:3, preferably from 1:50 to 1:5, more preferably from 1:30 to 1:5.

The skilled person in the art will readily identify the required reaction time for functionalization to take place.

In a particular embodiment, the process of the invention requires a minimum of 1, 5, 10, 30 or 60 minutes. In another particular embodiment, the process of the invention requires a minimum of 2, 4, 6, 8, 10, 12, 14, 18, 24 or 48 hours.

In another particular embodiment, the process of the invention requires an inert atmosphere. Examples of such are nitrogen atmospheres and argon atmospheres.

In an embodiment, after the reaction has been completed, the functionalized rubber polymer is recovered from the organic solvent. For example, by means such as decantation, filtration, centrifugation, and others known to those having ordinary skill in the art. In a particular embodiment of the process of the invention, the crude functionalized polymer is isolated by addition of a polar solvent leading to its precipitation. Examples of suitable polar solvents are lower alcohols containing from 1 to 4 carbon atoms, such as methanol, ethanol, isopropanol, n-propanol, t-butanol and mixtures therefrom.

Notably, in the processes described herein the functional groups are introduced in a post-polymerization step, so that there is no need to protect them to avoid interference with the anionic growing chains during the anionic polymerization process. Thus, one advantage of this invention with respect to the prior art, e.g. the use of functional monomers, is that it eliminates two typical steps in the functionalization processes during anionic polymerization: the protection of the functional groups before polymerization and their deprotection after polymerization.

A further advantage of this invention is that it provides the possibility of introducing a number of functional groups or functionalities depending on the source of nitrene or carbene used. Moreover, since the reaction occurring in the process of the invention is a mere addition with no side reactions, the basic polymer structure (monomer content and distribution, architecture and molecular weight distribution) are unchanged.

Figure 1:
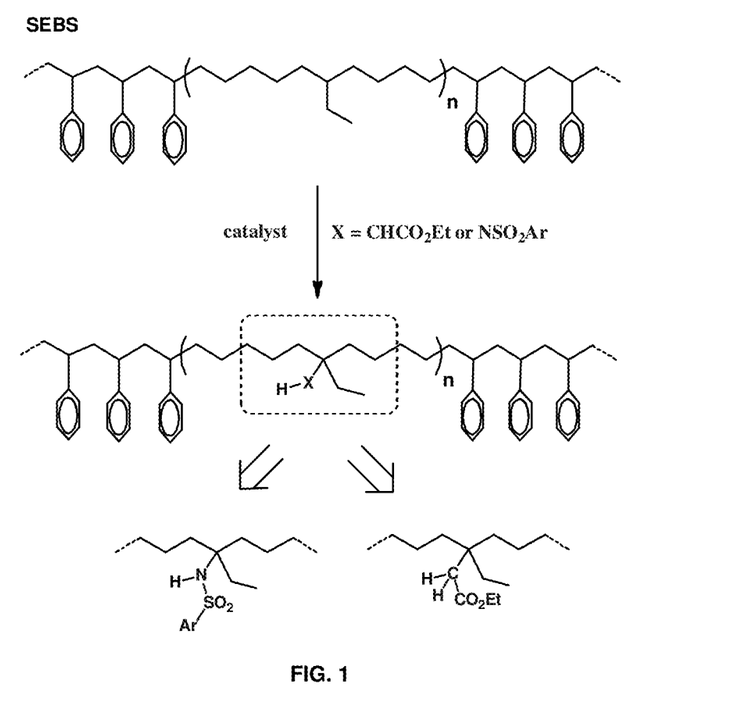
Figure 2:
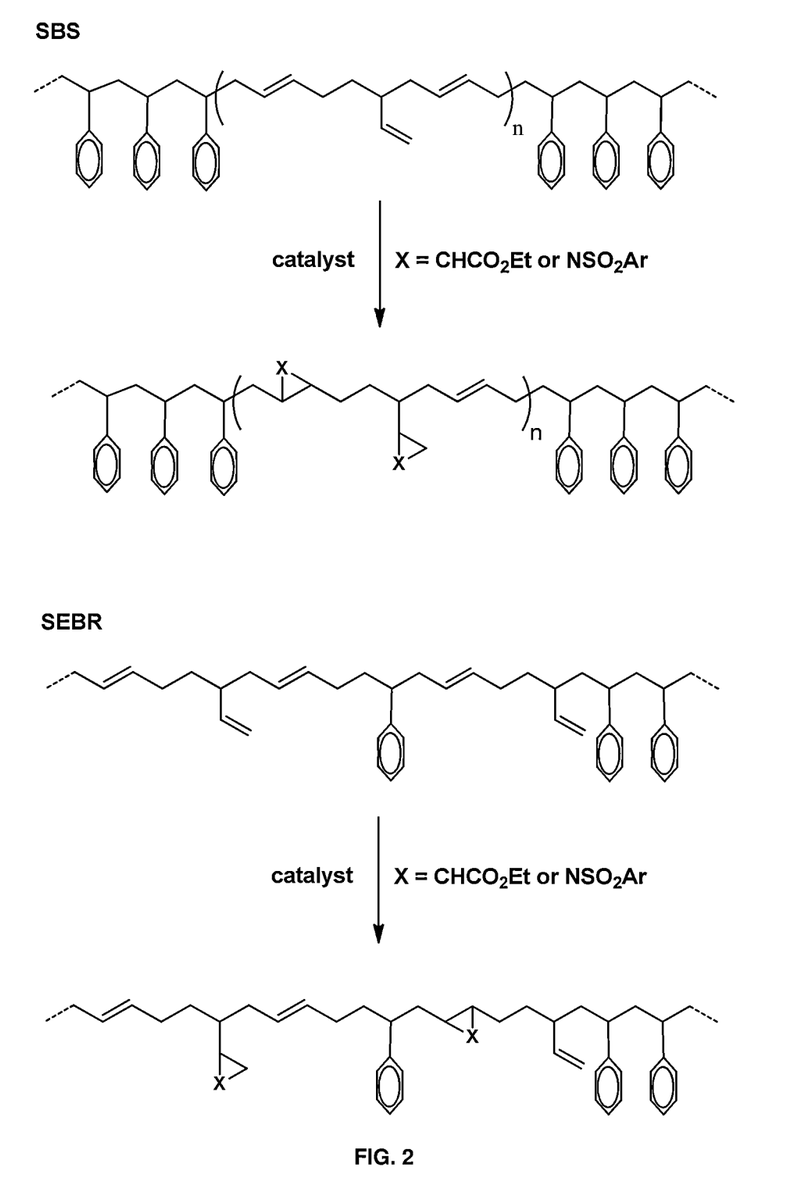

Without wishing to be bound to a particular theory, it is believed that in saturated rubbers such as SEBS, the main reaction sites are tertiary C—H bonds, which are converted into the corresponding —NHR or —CH$_2$CO$_2$R groups, respectively (see FIG. 1). Also, when the rubbers are insaturated rubbers such as SBS or SEBR, the main reaction sites are believed to be the double C=C bonds, which are converted into the corresponding aziridines or cyclopropanes (see FIG. 2). As shown in the examples and in the GPC data, no crosslinking processes are observed. This is in contrast to prior art methods where the rubber polymers are functionalized under thermal induced radical reaction conditions, which lead to crosslinking and chain scission side products.

Functionalized Polymer of the Invention

A second aspect of the invention is directed to a rubber polymer, functionalized with at least one group-NH$_n$SO$_2$(C$_6$H$_4$)R$^1$, wherein each occurrence of R$^1$ is independently selected from H, C$_{1-6}$ alkyl, C$_{3-7}$ cycloalkyl, C$_{6-10}$ aryl, I, Br, Cl, F, NO$_2$, CF$_3$, OR$^3$, COOR$^3$, OCOR$^3$ and NR$^3{}_2$, wherein each R$^3$ is independently selected from H, C$_{1-6}$ alkyl, C$_{3-7}$ cycloalkyl, C$_{6-10}$ aryl; and wherein n is 0 or 1. The value of 0 corresponds to the formation of aziridine functional groups.

In a preferred embodiment, R$^1$ is selected from the group consisting of C$_{1-6}$ alkyl, I, Br, Cl, F, COOH, COO—C$_{1-6}$ alkyl or mixtures therefrom. Preferably, the phenyl aromatic ring is substituted with a R$^1$ substituent selected from the group consisting of C$_{1-6}$ alkyl, I, Br, Cl, F, COOH, COO—C$_{1-6}$ alkyl.

In a particular embodiment, n is 1.

In yet another particular embodiment, n is 0.

In a particular embodiment, the functionalized rubber polymer comprises between 0.01 and 20 wt % of —NH$_n$SO$_2$(C$_6$H$_4$)R$^1$ moieties, with R$^1$ as defined above, with respect to the total weight of the functionalized rubber polymer. In this context, the term moiety is to be interpreted as similar to functional groups and is used to identify those groups that resulted from the reaction with a nitrene source. Preferably, the functionalized rubber polymer comprises between 0.01 and 5 wt % of —NH$_n$SO$_2$(C$_6$H$_4$)R$^1$ moieties, more preferably between 0.01 and 2 wt % of —NH$_n$SO$_2$(C$_6$H$_4$)R$^1$ moieties, with respect to the total weight of the functionalized rubber polymer.

In a preferred embodiment, the functionalized rubber polymer is characterized by a Polydispersity Index (PDI) below 3, below 2, preferably below 1.5, more preferably below 1.3, even more preferably below 1.2.

The functionalized rubber polymer, just as the rubber polymer used in the process of the invention, is to be understood as either a hydrogenated or a non-hydrogenated copolymer comprising conjugated diene and alkenyl aromatic monomers or a diene homopolymer or copolymer comprising conjugated diene monomers.

In a particular embodiment, the functionalized rubber polymer is hydrogenated. In another particular embodiment, the functionalized rubber polymer is non-hydrogenated.

According to a particular embodiment, at least 50% of the original dienic unsaturations of the functionalized polymer are hydrogenated, preferably more than 85%, more preferably more than 95%. According to another particular embodiment, less than 1% of the aromatic units are hydrogenated.

Suitable and preferred embodiments for the alkenyl aromatic monomers, conjugated diene monomers and the rubber polymer are as defined above in relation to the process of the invention. In the present invention, the disclosed molecular weights of the polymers relate to the molecular weight in the distribution peak, M$_p$. The molecular weights of the polymers of the invention can be adjusted depending on requirements and varying the quantity of polymerized monomers but normally have a molecular weight in the distribution peak, M$_p$, from about 1,000 g/mol to about 1,000,000 g/mol. Preferably, the M$_p$ of the polymer ranges from about 5,000 g/mol to about 500,000 g/mol, and more preferably between 20,000 and 400,000 g/mol. The molecular weight of the polymers synthesized by the process of the present invention is conveniently measured by the GPC technique.

A third aspect of the invention is directed to a functionalized rubber polymer, obtainable by the process of the invention.

In a particular embodiment, the functionalized rubber polymer obtainable by the process of the invention comprises at least one group selected from —NH$_n$SO$_2$(C$_6$H$_4$)R$^1$ and —CH$_{n+1}$R$^2$, wherein each occurrence of R$^1$ is independently selected from H, C$_{1-6}$ alkyl, C$_{3-7}$ cycloalkyl, C$_{6-10}$ aryl, I, Br, Cl, F, NO$_2$, CF$_3$, OR$^3$, COOR$^3$, OCOR$^3$ and NR$^3{}_2$, wherein each R$^3$ is independently selected from H, C$_{1-6}$ alkyl, C$_{3-7}$ cycloalkyl, C$_{6-10}$ aryl; and wherein each occurrence of R$^2$ is independently selected from —CO$_2$R, wherein R is a $C_{1-6}$ alkyl, $C_{3-7}$ cycloalkyl and $C_{6-10}$ aryl group and wherein n is 0 or 1. The value of 0 corresponds to the formation of aziridine or cyclopropane functional groups.

In a preferred embodiment, the functionalized rubber polymer obtainable by the process of the invention comprises at least one group selected from —$NH_nSO_2(C_6H_4)R^1$, with $R^1$ and n as defined above.

In a preferred embodiment, $R^1$ is selected from the group consisting of $C_{1-6}$ alkyl, I, Br, Cl, F, COOH, COO—$C_{1-6}$ alkyl or mixtures therefrom. Preferably, the phenyl aromatic ring is substituted with a $R^1$ substituent selected from the group consisting of $C_{1-6}$ alkyl, I, Br, Cl, F, COOH, COO—$C_{1-6}$ alkyl.

In another preferred embodiment, the functionalized rubber polymer obtainable by the process of the invention comprises at least one group selected from —$CH_{n+1}R^2$, with $R^2$ and n as defined above.

In another preferred embodiment, R is a $C_{1-3}$ alkyl group.
In another preferred embodiment, $R^2$ is —$CO_2Et$.
In a particular embodiment, n is 1.
In yet another particular embodiment, n is 0.

In a particular embodiment, the functionalized rubber polymer obtainable by the process of the invention comprises between 0.01 and 20 wt % of —$NH_nSO_2(C_6H_4)R^1$ moieties, with $R^1$ as defined above, with respect to the total weight of the functionalized rubber polymer. In this context, the term moiety is to be interpreted as similar to functional groups and is used to identify those groups that resulted from the reaction with a nitrene source. Preferably, the functionalized rubber polymer comprises between 0.01 and 5 wt % of —$NH_nSO_2(C_6H_4)R^1$ moieties, more preferably between 0.01 and 2 wt % of —$NH_nSO_2(C_6H_4)R^1$ moieties, with respect to the total weight of the functionalized rubber polymer.

In another preferred embodiment, the functionalized rubber polymer obtainable by the process of the invention comprises between 0.01 and 20 wt % of —$CH_{n+1}R^2$, with $R^2$ as defined above, with respect to the total weight of the functionalized rubber polymer. In this context, the term moiety is to be interpreted as similar to functional groups and is used to identify those groups that resulted from the reaction with a carbene source. Preferably, the functionalized rubber polymer comprises between 0.01 and 5 wt % of —$CH_{n+1}R^2$ moieties, more preferably between 0.01 and 2 wt % of —$CH_{n+1}R^2$ moieties, with respect to the total weight of the functionalized rubber polymer.

In a preferred embodiment, the functionalized rubber polymer obtainable by the process of the invention is characterized by a Polydispersity Index (PDI) below 3, below 2, preferably below 1.5, more preferably below 1.3, even more preferably below 1.2.

In an embodiment, the functionalized rubber polymer, in particular that obtainable by the process of the invention, comprises catalyst $Tp^xAg$ as described above, in particular embedded or occluded in the structure of the polymer. In an embodiment, the functionalized rubber polymer obtainable by the process of the invention comprises silver ions, in particular Ag(I), Ag(II) or Ag(III) ions, and in particular embedded or occluded in the structure of the polymer. The amount of catalyst or silver ions can range from 0.1 to 5% by weight with respect to the total weight of the functionalized rubber polymer including the embedded or occluded catalyst or silver ions. In another embodiment, the functionalized rubber polymer obtainable by the process of the invention comprises no copper ions, in particular embedded or occluded in the structure of the polymer.

All disclosed embodiments and claims related to the rubber polymer of the invention are to be interpreted as also applicable to the rubber polymer obtainable according to the process of the invention.

Uses and Applications

The inventors have surprisingly found that a catalyst of formula $Tp^xAg$, wherein $Tp^x$ represents a hydrotris(pyrazolyl)borate ligand, has several advantages in the functionalization of rubber polymers. The present invention is thus not only limited to new polymers and their synthesis processes, but also includes uses and applications thereof.

In this way, a fourth aspect of the invention is directed to the use of a catalyst of formula $Tp^xAg$ in the functionalization of rubber polymers, wherein $Tp^x$ represents a hydrotris(pyrazolyl)borate ligand.

In an embodiment, the hydrotris(pyrazolyl)borate ligand, $Tp^x$, has the following formula wherein Ra, Rb and Rc are independently selected from H, halogen, $C_{1-6}$ alkyl, $C_{1-6}$ haloalkyl, $C_{3-7}$ cycloalkyl, $C_{6-10}$ aryl, $C_{6-10}$ aryl substituted with halogen and $C_{6-10}$ aryl substituted with $C_{1-6}$ alkyl.

In a particular embodiment, Ra, Rb and Rc are independently selected from H, Br, Cl, Me, Et, iPr, tBu, $CF_3$, Cy, Ph and p-Cl—$C_6H_4$.

In a particular embodiment of the fourth aspect of the invention, the hydrotris(pyrazolyl)borate ligand, $Tp^x$, is selected from the group consisting of hydrotris(3,4,5-tribromopyrazolyl)borate ($Tp^{Br3}$), hydrotris(3-phenyl-pyrazolyl)borate ($Tp^{Ph}$), hydrotris(3,5-dimethyl-4-bromopyrazolyl)borate ($Tp^{*,Br}$), hydrotris(3,5-bis(trifluoromethy)-4-bromopyrazolyl)borate ($Tp^{(CF3)2,Br}$) and hydrotris(3,5-dimethyl-pyrazolyl)borate ($Tp^*$).

In a particular embodiment, the catalyst is used in the form of precursor $Tp^xAgL$, wherein L is a ligand selected from an aprotic solvent, such as acetonitrile, THF or acetone. In this case, the L ligand first dissociates leading to the active catalyst $Tp^xAg$.

The rubber polymer to be functionalized according to the fourth aspect of the invention is as described above. In a particular embodiment, the polymer is selected from the group consisting of polybutadiene, polyisoprene, isoprene-butadiene copolymers, styrene-butadiene copolymers, styrene-isoprene copolymers, styrene-butadiene-styrene copolymers, styrene-isoprene-butadiene copolymers and styrene-ethylene-butylene-styrene copolymers.

As shown below in the examples, the process of the invention allows obtaining functionalized rubber polymers with improved properties. In this way, the inventors have surprisingly came across a process for the production of a rubber polymer with improved compatibility characteristics. Enhanced physical properties as well as polymer compatibility and polarity are important characteristics of the resulting in-chain functionalized polymers, which gives them advantages over non-functionalized polymers or over chain-end functionalized rubber polymers. Additionally, surface activity can be modified (high or low surface energy), making them useful in applications where one wants to improve adhesion, miscibility, dispersibility or control of wettability. When the in-chain functionalized rubber polymers of the present invention are mixed with non-functionalized polymers, the functional groups of different nature than that of the non-functionalized polymers allow them to position themselves selectively to the surface of the mixture, thus modifying their surface properties even with small amounts of the in-chain functionalized polymers.

For the above, a fifth aspect of the invention concerns the use of the functionalized rubber polymer of the invention, or of the functionalized rubber polymer obtainable according to the process of the invention, in asphalt compositions, tire compositions, adhesive compositions, tie layer compositions, sealant compositions, coating compositions, reinforcing compositions, overmolding compositions, plastics impact modification, engineering plastics blends compatibilization, fiber and nonwoven compositions, nanomaterials, medical devices, cable compositions and binders for electrodes in lithium-ion secondary batteries.

The functionalized rubber polymer of the invention, or the functionalized rubber polymer obtainable according to the process of the invention, can be used in adhesive compositions. The adhesive compositions might be a hot-melt adhesive, a solvent borne adhesive or a reactive adhesive (in which ingredients able to react with the in-chain functionalities of the polymers are added purposely) also encompassing light, UV and radiation curing compositions.

In case of the hot-melt adhesive, the functional groups present in the in-chain functionalized polymer might interact with the resin and with the substrate, improving compatibility with the resin and interaction with the substrate, giving adhesives with improved tack, peel and shear. The interaction with the substrate might be improved by hydrogen bonding formation or by specific interactions of the functional groups in the polymer with the substrate. The same behaviour might be expected when in-chain functionalized polymers are added into solvent born adhesives.

The hot melt adhesive composition may contain at least one additive selected from the group that consists of tackifying resins, stabilizers, plasticizers and antioxidants. In some of these applications, from about 15 to 30, and more preferably from about 18 to 25, parts by weight of the in-chain functionalized polymer object of this invention are mixed with other components of conventional adhesive formulation, such as tackifiers, stabilizers, plasticizers and antioxidants, to give these adhesive compositions improved properties compared with the adhesives prepared with the same composition, using the same type of polymer without the introduction of the functional groups. Examples of suitable tackifiers include resins with high and low softening points, which are compatible with the polymer. These include hydrogenated resins, colophony esters, polyterpene resins, terpene phenolic resins, and coumarone-indene resins. In some illustrative modalities, the quantity of fixing resins in the composition ranges from about 45 to 65% by weight. The plasticizers, generally known as extender oils, include mineral oils, paraffin oils and naphthenic oils. In some illustrative modalities, the quantity of plasticizer in the composition ranges from about 15 to 30% by weight. The antioxidants are commonly added to the adhesive composition in quantities from about 0.05 to 3% by weight. The examples of antioxidants include phenolic compounds, and thio compounds. In a preferred embodiment the composition comprises from about 15 to 30% by weight of tackifying resin, from about 15 to 30% by weight of plasticizer and from about 0.05 to 2% by weight of antioxidant. In a preferred embodiment, the adhesive compositions can be used in multiple applications, for example in adhesives for packaging, labels and adhesive tapes, construction and as pressure-sensitive adhesives to be used in manufacturing disposable elastic articles.

In case of the reactive adhesive, it is sought that the in-chain functionalized polymer is equipped with functional groups able to react or to be activated by light, radiation or UV light. The functional groups of the polymer of this invention placed in the adhesive formulation might react in this way with the substrate or with another chemical present in the adhesive formulation like in two pot adhesives.

Another use for the functionalized polymer of the present invention is a sealant composition which contains the polymers of the invention.

Another use for the functionalized polymer of the present invention is a coating composition, in which the polymers of this invention help to adhere to the substrate and/or make the surfaces to be coated either preferably more hydrophobic or hydrophilic, depending on the functional groups attached to the polymers.

Furthermore, the polymers of the present invention are useful for reinforcing materials or to prepare composite materials, which mean that these polymers can be mixed with a reinforcing material or with the material that is going to be reinforced. The materials which are going to be reinforced can be preferably selected from the group that consists of asphalts, adhesives, plastics, tyres and nanomaterials. Good results have been obtained when plastics selected from polyamides, polyurethanes, polyethers, polysulfones, polyether ketones, polyether ether ketones, polyetherimides, polycarbonates, polyesters, polystyrene and copolymers of them are reinforced. The reinforced material or compound is useful for the production of articles and can be for example an extruded article, an injection-moulded article, a compression-moulded article or a tyre.

Another use for the functionalized polymer is in a modified asphalt which comprises asphalt mixed with the polymers of the invention. The asphalts may contain from about 1 to 25% by weight of the polymer based on the total weight of the asphalt and of polymer. Preferably, the modified asphalt contains from about 5 to 20% by weight of the polymer. These asphaltic mixtures modified with the polymers of this invention can be used in applications such as roads, asphalt membranes and the like.

Another use for the functionalized polymer of the present invention is directed to a modified material which comprises a mixture of the polymers of this invention and a plastic of any nature, more preferable an engineering plastic. The polymers of the invention may be added to improve the physical properties, in particular resistance to impact, with respect to the virgin plastic. The mixture typically contains from about 0.01 to 90% by weight of the polymer, based on the total weight of the mixture, preferably from about 1 to 40% by weight. According to one embodiment, the plastic preferably contains at least one polymer that is selected from the group that consists of polystyrene, polybutadiene, polyisoprene and random copolymers, in block or progressive, prepared from monomers selected from the group that consists of styrene, butadiene and isoprene, and which preferably have an average molecular weight in the distribution peak of about 3,000 to 300,000 g/mol. A great variety of engineering plastics can be mixed, but preferably the engineering plastic is selected from the group that consists of polyamides, polyurethanes, polyethers, polysulfones, polyether ketones, polyether ether ketones, polyimides, polyetherimides, polycarbonates, polyesters, polystyrene and copolymers of them. The polymer of the present invention preferably contains polystyrene for its mixture in plastics.

The polymers of the present invention are useful to obtain fibers and nonwovens, prepared preferably by electrospinning, spunbond, meltblown or any other known method. Depending on the functionality possessed by the in-chain functionalized polymer, fibers of polymer with hydrophilic or hydrophobic surfaces are to be obtained. Of special interest are hydrophobic surfaces, which are water repellent and self-cleaning. Fluorine groups, in general, are known to impart hydrophobicity due to their low surface energy. These fibers of polymer can be used advantageously in applications to obtain specialty clothing, surgical threads and the like.

The polymers of the present invention are also useful to prepare organic or inorganic nanomaterials with improved properties, given the high possibility of interaction, both physical or chemical, of the functional groups present in the polymers of this invention with complementary functional groups present in the nanoparticle.

The polymers of the invention are also useful in medical applications, such as in the fabrication of medical tubing, particularly by incorporating biocompatible functional groups into the polymer chain.

The polymers of the present invention are also useful to prepare compositions for cable applications, where a thermoplastic elastomer (TPE) derived from the functionalized polymers of the invention are added to a formulation which is subsequently crosslinked to obtain a fire-resistant halogen free cable useful as insulator in the electrical or automotive sectors.

In additional preferred embodiments of the present invention, the preferences and particular embodiments described above are combined. The present invention is also directed to such combinations of preferences and particular embodiments.

Throughout the description and claims the word "comprises" and its variants do not aim to exclude other technical characteristics, additives, components or steps. For persons skilled in the art, other objects, advantages and characteristics of the invention shall be gathered in part from the description and in part from practice of the invention.

EXAMPLES

The present invention will now be described by way of examples which serve to illustrate the construction and testing of illustrative embodiments. However, it is understood that the present invention is not limited in any way to the examples below.

All the polymerizations and hydrogenations in the following examples were performed in autoclave reactors with an inner capacity of 2 L, provided with a control system for temperature, stirring, and flow-meters, as well as nitrogen inlets, venting and sampling lines.

The polymers obtained were characterized by gel permeation chromatography (GPC) and by $^1$H NMR technique in CDCl$_3$ at 500 MHZ.

Samples of isolated polymers were studied by GPC, showing that the $M_w$, $M_n$ and PDI were similar to those of the corresponding starting materials, verifying the absence of chain scission or chain crosslinking processes.

The identity of the groups incorporated at the polymer chain was confirmed by $^1$H NMR spectroscopy. For example, typical resonances of the CH$_2$CO$_2$Et, CHCO$_2$Et (cyclopropane), NHTs and NTs (aziridine) were identified in the $^1$H-NMR spectra. Integration of such resonances with respect to some characteristic resonances of the polymer as well as with those of external standard added allowed establishing the relative amount of the functional groups incorporated in each case. In this way, percentage of incorporation was determined by $^1$H NMR.

Example 1. Functionalization of SEBS with [N-(p-toluenesulfonyl)imino]phenyliodinane This functionalization reaction was repeated three times with different amounts of reactants, see table below for further details.

The SEBS rubber polymer was dissolved in 1,2-dichloroethane, to which N-(p-toluenesulfonyl)imino]phenyliodinane (PhINTs) and silver hydrotris(3,5dimethyl-4-bromopyrazolyl)borate catalyst (Tp$^{*,Br}$Ag) were added.

The mixture was heated at 80° C. under a nitrogen atmosphere for 12 h. After cooling, methanol (100-200 mL) was added and the precipitated functionalized rubber was separated by filtration and dried under vacuum. Isolated yields of polymers were above 95%, and incorporation of NHTs units were in the 1-5% w/w range (see table below) corresponding to pendant-NHTs groups derived from the insertion of the NHTs units mainly into the tertiary sites of the rubber chain.

| Tp$^{*,Br}$Ag (mmol) | PhINTs (mmol) | SEBS (g) | C$_2$H$_4$Cl$_2$ (mL) | Molar Ratio Cat:PhINTs:rubber | NHTs incorporation (% w/w) |
|---|---|---|---|---|---|
| 0.05 | 3 | 2.5 | 40 | 1:60:700 | 1.5 |
| 0.05 | 3 | 5 | 80 | 1:60:1400 | 2.5 |
| 0.05 | 1.5 | 2.5 | 40 | 1:30:700 | 3.1 |

Example 2. Functionalization of Unsaturated Rubbers with [N-(p-toluenesulfonyl)imino]phenyliodinane In a variation of Example 1, and working at room temperature in cyclohexane as the solvent, modified rubbers were obtained in >95% yield with a degree of incorporation of NHTs units within the interval 1-5%. In this case the unsaturated rubber was modified upon forming aziridine rings derived from the addition of the NHTs units to the double bonds of the unsaturated rubber.

Example 3. Functionalization of SEBS with Ethyl Diazoacetate

A cyclohexane solution of the rubber and catalyst in similar concentrations to those described in Example 1 was prepared. Ethyl diazoacetate (EDA) was dissolved in cyclohexane and the solution slowly added to the above mixture with the aid of an automatic addition system for 12 h at room temperature. The mixture was then stirred for an additional hour before removal of the solvent under reduced pressure, re-dissolved in the minimum amount of tetrahydrofuran and precipitated with methanol. After filtration and drying under vacuum, >95% of the mass was recovered. $^1$H NMR studies revealed 1-5% w/w incorporation of the $CHCO_2Et$ group onto the polymeric chain, now bearing pendant-$CH_2CO_2Et$ units.

Example 4. Functionalization of Unsaturated Rubbers with Ethyl Diazoacetate

In a variation of Example 3, and using an unsaturated rubber, the modified material was isolated with high mass recovery (>95%). The incorporation of the $CHCO_2Et$ units took place onto the C=C bonds of the unsaturated rubber, leading to the formation of cyclopropane units. Percentage of incorporation: 1-5% w/w.

Example 5. Functionalization of Saturated Rubbers with Ethyl Diazoacetate Followed by PhINTs Polymeric rubber materials can be functionalized in a consecutive manner with the same catalyst and in one-pot fashion upon using $Tp^{*,Br}Ag$ catalyst in cyclohexane as the reaction medium.

In this way, a solution of EDA was first slowly added to the stirred solution of catalyst and rubber, at room temperature. When the addition was finished (12 h), PhINTs was added and further 12 h of stirring at 80° C. afforded rubbers with carboxylate and amine functionalities. The isolated materials showed $^1$H NMR spectra consistent with the presence of pendant-$CH_2CO_2Et$ and -NHTs groups derived from the metal-catalyzed insertion of carbene-$CHCO_2Et$ and nitrene-NTs groups, respectively. Percentage of incorporation: 1-5% w/w. for each functionality.

Example 6. Functionalization of Unsaturated Rubbers with Ethyl Diazoacetate Followed by PhINTs In a variation of example 5, the same protocol was applied to unsaturated rubbers, leading to modified materials containing cyclopropane and aziridine rings within the rubber structure. Both the carbene and nitrene incorporations were run at room temperature, leading to incorporations within 1-5% w/w in each unit.

Example 7. Functionalization with Different Catalysts

Instead of the $Tp^{*,Br}Ag$ catalyst used in Examples 1-6, the present example consisted in repeating the experiments but with a catalyst of the composition $Tp^xAgL$, with $Tp^x$ representing the ligands shown in the Table below, and L being either acetonitrile or tetrahydrofuran.

| $Tp^x$ | $R^a$ | $R^b$ | $R^c$ |
|---|---|---|---|
| $Tp^{Me2}$ | Me | H | Me |
| $Tp^{Br3}$ | Br | Br | Br |
| $Tp^{*,Br}$ | Me | Br | Me |
| $Tp^{(CF3)2,Br}$ | $CF_3$ | Br | $CF_3$ |
| $Tp^{Ph}$ | H | H | Ph |

Comparative Example 1. Functionalization with a Copper Catalyst

The use of the copper analogs $Tp^xCuL$ as catalysts also lead to the functionalization of the rubbers. However, the existence of some remaining occluded copper ions in the isolated materials induced the appearance of greenish color as well as the loss of solubility in tetrahydrofuran, evidencing the existence of radical-mediated crosslinking processes. These impurities are behind the appearance of color in the rubber when exposed to air.

Comparative Example 1.1. Carbene Functionalization with a Copper Catalyst Vs with a Catalyst According to the Present Invention Experiments were performed to compare the effect of a $Tp^{Br3}Cu(NCMe)$ or $Tp^{*,Br}Ag$ catalyst employed for the EDA-functionalisation of an unsaturated rubber polymer (SB tappered di block copolymer (1.0) or SBS triblock copolymer (6.0)) on the stability of said unsaturated rubber. The rubbers were functionalised as follows:

After dissolving the catalyst and the polymer in cyclohexane, under an inert atmosphere, a solution of diazo compound EDA in cyclohexane was added from a slow addition syringe (programmable addition time). After adding for 12 h, the volume of solvent was reduced under reduced pressure and methanol was added to precipitate the rubber. The rubber was analyzed by 1 H NMR to confirm the incorporation of $CHCO_2Et$ functionality.

The obtained functionalized polymers were stored at room temperature during two months and their evolution was monitored. Interestingly, after two months of storage at room temperature, in contrast with the sample functionalized with the silver catalyst, the sample functionalized with the copper catalyst presented problems of solubility since it could not be completely dissolved in THF and widening of the molecular weight distribution was observed, evidencing that undesired cross-linking reactions had taken place in this polymer.

Comparative Example 1.2. Nitrene Functionalization with a Copper Catalyst Vs with a Catalyst According to the Present Invention Experiments were performed to compare the effect of a $Tp^{Br3}Cu(NCMe)$ or $Tp^{*,Br}Ag$ catalyst employed for the PhINT-functionalisation of an unsaturated rubber polymer (SBS triblock copolymer) on the degree of functionalization and molecular weight distribution. The rubbers were functionalised as follows:

A solution of the catalyst and rubber was prepared in cyclohexane, under an inert atmosphere, in the proportions indicated in the Table below. Once the rubber dissolved, the nitrene source was added and the mixture was allowed to stir overnight. Experiments with the silver catalyst were performed at room temperature, while those with the copper catalyst were carried out at 60° C. The next day, the volume of solvent as reduced under reduced pressure and methanol was added to precipitate the rubber. The rubber was filtered, dried under vacuum and analyzed by 1 H NMR to determine, by integration with trimethoxybenzene (TMB) as internal standard, the proportion of "NTs" incorporated in the rubber.

The Table below shows the comparison between both silver and copper catalysts. It was observed that the polymer functionalized with $Tp^{*,Br}Ag$ catalyst afforded greater levels of functionalization despite the use of lower relative amounts of catalyst and functionalizing agent and mild reaction conditions compared to those employed in the $Tp^{Br3}Cu(NCMe)$ experiment.

| Essay | SBS triblock copolymer (g) | Catalyst (mmol) | PhINTs (mmol) | Functionalized rubber (wt %) |
|---|---|---|---|---|
| 1 | 2.0 | $Tp^{Br3}Cu(NCMe)$ (0.020) | 0.50 | 0.6 |
| 2 | 5 | $Tp^{*,Br}Ag$ (0.043) | 0.863 | 0.8 |

Furthermore, it was observed that the functionalized rubber obtained by using the silver catalyst has a molecular weight distribution similar to that of virgin rubber, whereas the functionalized rubber when using the copper catalyst shows widening in the molecular weight distribution, indicative of the generation of undesirable cross-linking reactions.

Example 8. Functionalization with Different Precursors

Instead of the PhINTs nitrene precursor used in Examples 1, 2, 5 and 6, the present example consisted in repeating the same experiments but with a different nitrene precursor. The nitrene precursors used were PhI=N—$SO_2(C_6H_4)R^1$, where $(C_6H_4)R^1$ is selected from phenyl para substituted with $C_{1-6}$ alkyl, I, Br, Cl, F, COOH or COO—$C_{1-6}$ alkyl.

Example 9. Characterization of the Functionalized Rubbers

An isolated, exactly weighted sample of functionalized SEBS prepared as described in Example 1 was dissolved in $CDCl_3$ and a naphthalene was added as internal standard. The $^1H$ NMR (400 MHZ) spectrum showed a resonance signal centered at 2.48 ppm assigned to the Me group of the tosyl moiety in the functionalized rubber. Integration of this signal with those of naphthalene gave the degree of functionalization shown in the Table contained in Example 1.

Further, GPC studies carried out with the above sample dissolved in THF, gave $M_n$=77517 and PDI=1.10, that compare well with those of the initial SEBS ($M_n$=73964, PDI=1.11).

Figure 3:
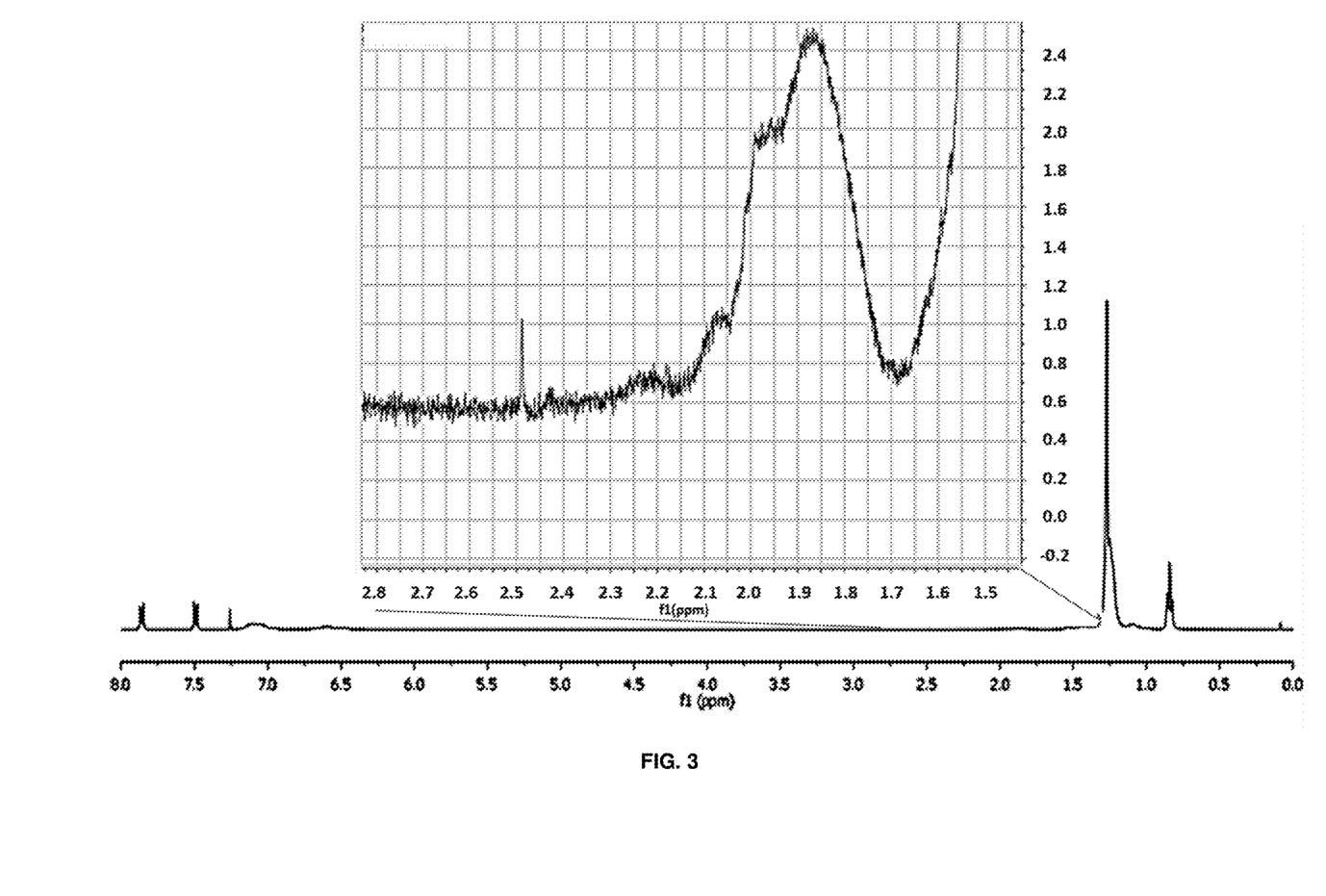
Figure 4:
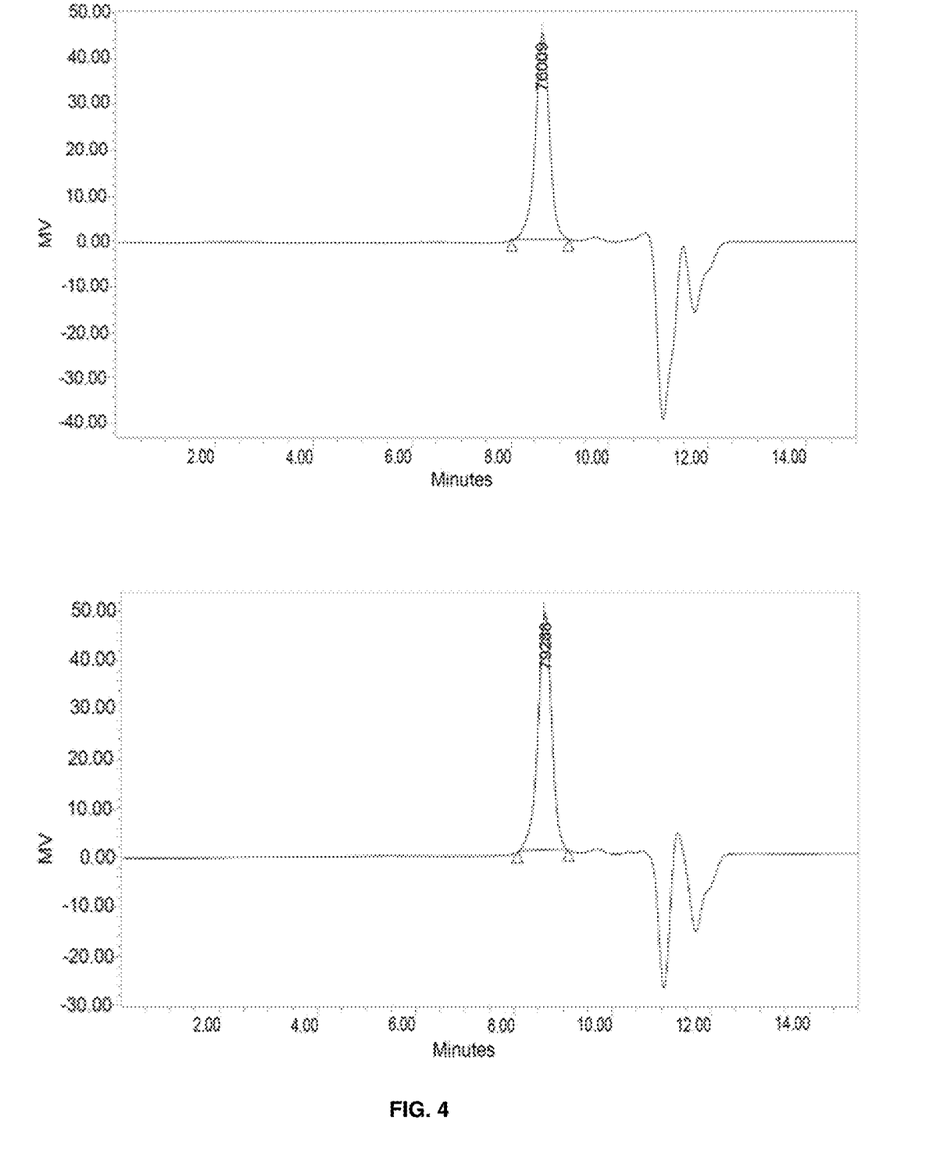

FIGS. 3 and 4 show the NMR and GPC data.

Example 10. Charpy Impact Tests and SEM Analysis

Charpy impact resistance essays were performed at 23° C. and at −30° C. for 4 different samples of polyamide-6 (comparative sample 1) and its blends containing 20% wt. SEBS (comparative sample 2), 20% wt. SEBS-g-MA (1.4% functionalization, comparative sample 3; SEBS-g-MA=SEBS functionalized with maleic anhydride by reactive extrusion), and 10% wt. SEBS functionalized with NTs (4.2% functionalization, sample 4). Essays were conducted according to norm ISO179-1.

Before being subjected to extrusion, the pre-blends were added with antioxidant Irganox-1330™ and dried at 80° C. overnight under inert atmosphere. Pre-blends were extruded in a Eurolab™ extruder equipped with 6 heating zones (210, 215, 220, 225, 230, 240° C.), and injected in a Sandretto™ 6GV-50 injection molding machine to obtain specimens for impact testing.

| Sample | Composition | Notched Charpy impact 23° C., $KJ/m^2$ | Notched Charpy impact −30° C., $KJ/m^2$ |
|---|---|---|---|
| comparative 1 | 100% Polyamide-6 | 6.7 | 1.7 |
| comparative 2 | 20% SEBS | 4.7 | 2.6 |
| comparative 3 | 20% SEBS-g-MA 1.4% f | 35 | 9.3 |
| 4 | 10% SEBS-N(H)Ts 4.2% f | 67.8 | 12.0 | f stands for functionalization degree

Figure 5:
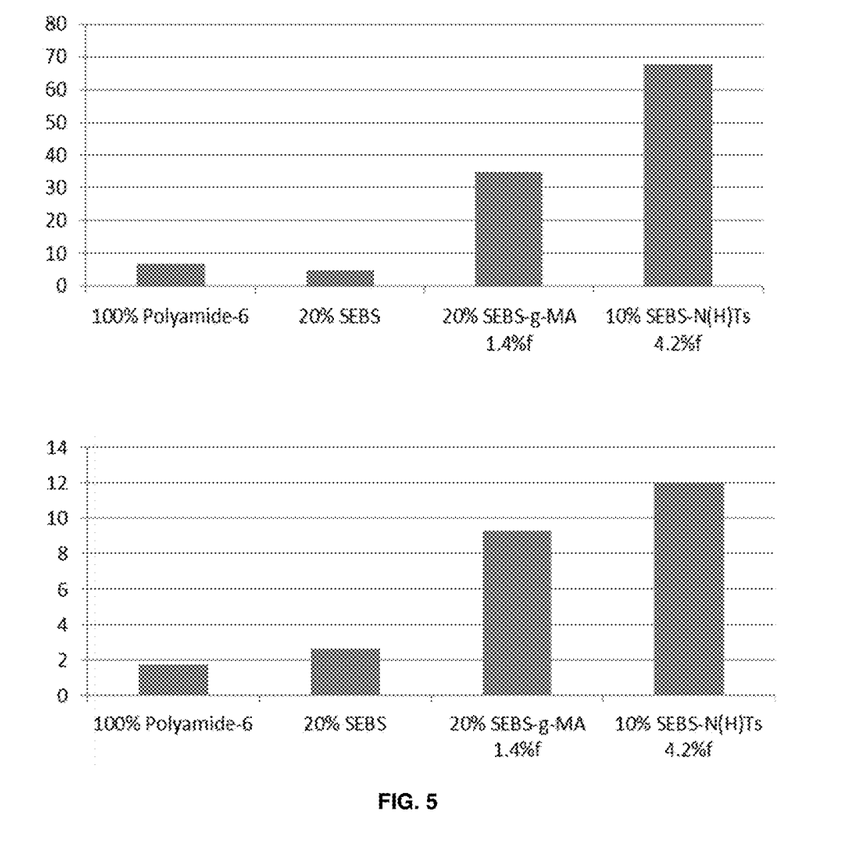

FIG. 5 shows a graphical representation of the data of the table above.

Figure 6:
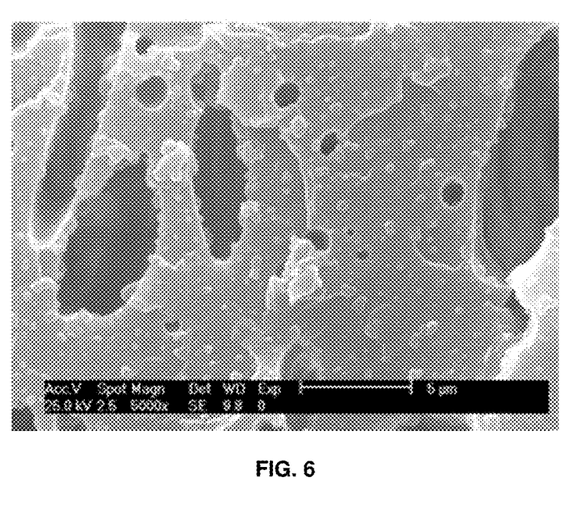
Figure 7:
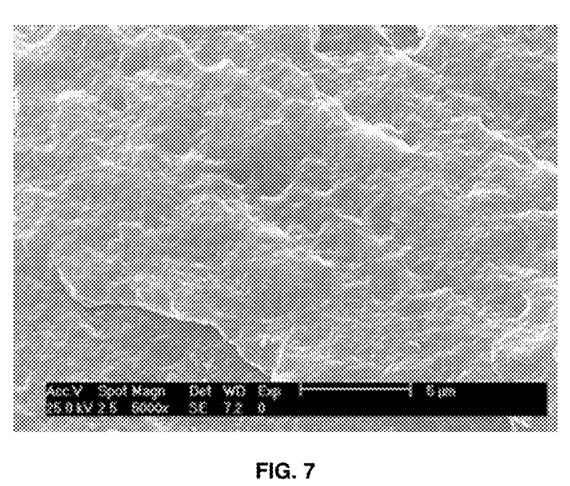
Figure 8:
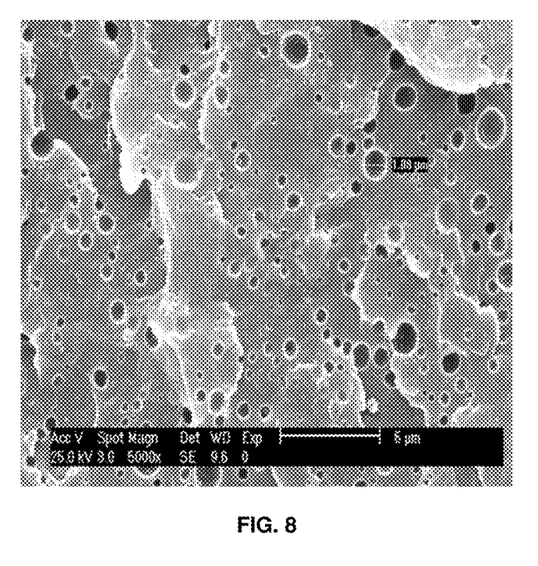

Impact resistance values measured under different conditions for mixtures containing only non-functionalized SEBS as an elastomeric component are equivalent to those detected for pure polyamide-6. Functionalized SEBS materials greatly improve impact resistance, particularly p-toluene sulfonyl amine functionalized SEBS, which provides better values adding half the amount of SEBS-g-MA SEM imaging (Phillips XL30 ESEM 20 KV microscope) of the samples is shown in FIGS. 6, 7 and 8. Prior imaging, samples were treated with xylene at room temperature for 96 hours. After being dried in vacuum overnight, samples were fractured in liquid nitrogen and submitted to deposition of a 3-4 nm-thick layer of Au/Pd.

As shown in FIG. 6, non-functionalized SEBS (comparative sample 2) is highly incompatible with polyamide due to great heterogeneity in shape and size, being relevant the depth of the niches, indicating that the morphology of the dispersed phase corresponds to structures in veins or reefs, with very poor dispersion levels in polyamide.

FIG. 7 shows the morphology of comparative sample 3. It is observed a dispersion morphology in the form of drops, with relatively homogeneous size distributions. Feature sizes range between 50-100 nm.

FIG. 8 shows the morphology of sample 4, of the present invention. SEBS-N(H)Ts generates homogeneous blends with polyamide-6, confirmed by a well distributed homo-

The invention claimed is:

1. A process for the functionalization of a rubber polymer, comprising reacting the rubber polymer with at least one source of nitrene or carbene, in the presence of a catalyst of formula $Tp^xAg$, wherein $Tp^x$ represents a hydrotris(pyrazolyl)borate ligand.

2. The process according to claim 1, wherein the hydrotris(pyrazolyl)borate ligand, $Tp^x$, has the following formula wherein Ra, Rb and Rc are independently selected from H, halogen, $C_{1-6}$ alkyl, $C_{1-6}$ haloalkyl, $C_{3-7}$ cycloalkyl, $C_{6-10}$ aryl, $C_{6-10}$ aryl substituted with halogen and $C_{6-10}$ aryl substituted with $C_{1-6}$ alkyl.

3. The process according to claim 1, wherein the hydrotris(pyrazolyl)borate ligand, $Tp^x$, is selected from the group consisting of hydrotris(3,4,5-tribromopyrazolyl)borate, hydrotris(3-phenyl-pyrazolyl)borate, hydrotris(3,5-dimethyl-4-bromopyrazolyl)borate, hydrotris(3,5-bis(trifluoromethy)-4-bromopyrazolyl)borate and hydrotris(3,5-dimethyl-pyrazolyl)borate.

4. The process according to claim 1, wherein the rubber polymer is an optionally hydrogenated copolymer comprising conjugated diene and alkenyl aromatic monomers or an optionally hydrogenated diene homopolymer or copolymer comprising conjugated diene monomers.

5. The process according to claim 1, wherein the rubber polymer is selected from the group consisting of polybutadiene, polyisoprene, isoprene-butadiene copolymers, styrene-butadiene copolymers, styrene-isoprene copolymers, styrene-butadiene-styrene triblock copolymers, styrene-isoprene-butadiene triblock copolymers, styrene-isoprene-butadiene-styrene block copolymers, styrene-ethylene-propylene-styrene and styrene-ethylene-butylene-styrene copolymers.

6. The process according to claim 1, wherein the at least one source of nitrene is selected from the group consisting of $PhINSO_2(C_6H_4)R^1$, $NaClNSO_2(C_6H_4)R^1$ and $N_3SO_2(C_6H_4)R^1$, wherein $R^1$ is independently selected from H, $C_{1-6}$ alkyl, $C_{3-7}$ cycloalkyl, $C_{6-10}$ aryl, I, Br, Cl, F, $NO_2$, $CF_3$, $OR^3$, $COOR^3$, $OCOR^3$ and $NR^3_2$, wherein each $R^3$ is independently selected from H, $C_{1-6}$ alkyl, $C_{3-7}$ cycloalkyl and $C_{6-10}$ aryl, and/or wherein the at least one source of carbene is selected from the group consisting of $N_2CHCO_2R$ and $N_2C(R')CO_2R$, wherein R is selected from $C_{1-6}$ alkyl, $C_{3-7}$ cycloalkyl and $C_{6-10}$ aryl group and R' is a $C_{1-6}$ alkyl or $C_6-C_{12}$ aryl group.

7. The process according to claim 1, wherein the reaction is carried out at a temperature below 120° C.

8. Functionalized rubber polymer, obtainable by the process according to claim 7.

9. Functionalized rubber polymer according to claim 8 comprising at least one group $-NH_nSO_2(C_6H_4)R^1$, wherein each occurrence of $R^1$ is independently selected from H, $C_{1-6}$ alkyl, $C_{3-7}$ cycloalkyl, $C_{6-10}$ aryl, I, Br, Cl, F, $NO_2$, $CF_3$, $OR^3$, $COOR^3$ and $OCOR^3$, wherein $R^3$ is independently selected from H, $C_{1-6}$ alkyl, $C_{3-7}$ cycloalkyl and $C_{6-10}$ aryl, and wherein n is 0 or 1.

10. A composition selected from asphalt compositions, tire compositions, adhesive compositions, tie layer compositions, plastics, sealant compositions, coating compositions, reinforcing compositions, overmolding compositions, plastics impact modifiers, engineering plastics blends compatibilizers, fiber and nonwoven compositions, nanomaterials, cable compositions, and binders for electrodes in lithium-ion secondary batteries, said composition comprising the functionalized rubber polymer of claim 8.

* * * * *